(12) United States Patent
Stretton et al.

(10) Patent No.: US 7,341,225 B2
(45) Date of Patent: Mar. 11, 2008

(54) AIRCRAFT WING AND AEROENGINE ARRANGEMENT FOR ATTENUATING ENGINE NOISE

(75) Inventors: Richard G Stretton, Loughborough (GB); Alastair D Moore, Derby (GB)

(73) Assignee: Rolls-Royce plc, London (GB)

( * ) Notice: Subject to any disclaimer, the term of this patent is extended or adjusted under 35 U.S.C. 154(b) by 71 days.

(21) Appl. No.: 10/859,308

(22) Filed: Jun. 3, 2004

(65) Prior Publication Data

US 2005/0011988 A1 Jan. 20, 2005

(30) Foreign Application Priority Data

Jul. 2, 2003 (GB) ................. 0315431.7

(51) Int. Cl.
*B64D 27/00* (2006.01)
(52) U.S. Cl. ........................................ 244/54
(58) Field of Classification Search .............. 244/53 R, 244/54, 55, 1 N, 15, 35, 45 R
See application file for complete search history.

(56) References Cited

U.S. PATENT DOCUMENTS

| | | | |
|---|---|---|---|
| 1,695,394 A * | 12/1928 | Guido | 244/5 |
| 1,759,032 A * | 5/1930 | Bauer | 244/45 R |
| 2,611,555 A | 9/1952 | Custer | |
| 2,611,556 A * | 9/1952 | Custer | 244/12.6 |
| 3,035,792 A * | 5/1962 | Klapproth | 244/23 R |
| 3,326,498 A * | 6/1967 | Corning | 244/12.4 |
| 4,037,809 A * | 7/1977 | Legrand | 244/54 |
| 4,055,041 A * | 10/1977 | Adamson et al. | 60/226.1 |
| 4,598,886 A * | 7/1986 | Friebel et al. | 244/15 |
| 5,497,961 A * | 3/1996 | Newton | 244/54 |
| 6,409,123 B2 * | 6/2002 | Cambon | 244/130 |
| 6,588,703 B1 * | 7/2003 | Hartmann | 244/35 R |
| 6,854,687 B1 * | 2/2005 | Morgenstern et al. | 244/15 |
| 2002/0189896 A1 | 12/2002 | Tse | |

FOREIGN PATENT DOCUMENTS

GB 0 653 544 5/1951
GB 1 463 810 2/1977

OTHER PUBLICATIONS

M.E. Wang, Wing Effect On Jet Noise Propagation, AIAA 6th Aeroacoustics Conference, Jun. 1980.
Michael Taylor, The World's Most Comprehensive Aviation Reference Work, Brassey's World Aircraft & Systems Directory, 1966.

* cited by examiner

*Primary Examiner*—Tien Dinh
(74) *Attorney, Agent, or Firm*—W. Warren Taltavull; Manelli Denison & Selter PLLC

(57) ABSTRACT

An aircraft comprising an aeroengine and a noise reflective surface, the aeroengine capable of generating a hot exhaust jet and noise characterized in that the reflective surface is profiled to reflect noise from the aeroengine into the hot exhaust jet thereby attenuating reflected noise.

6 Claims, 2 Drawing Sheets

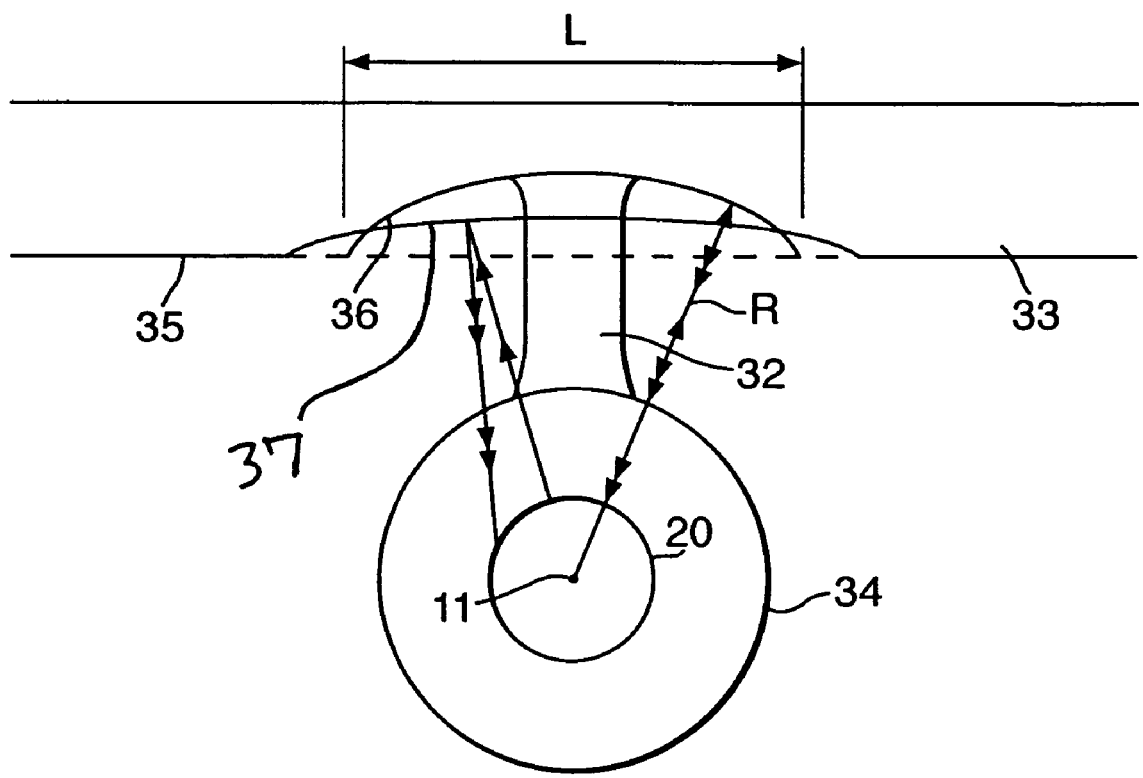

AIRCRAFT WING AND AEROENGINE ARRANGEMENT FOR ATTENUATING ENGINE NOISE

FIELD OF THE INVENTION

The present invention relates to a configuration of a surface of an aircraft, adjacent an aeroengine, for noise attenuation of the aeroengine.

BACKGROUND OF THE INVENTION

Noise generated by aeroengines is a significant proportion of the overall noise generated by an aircraft. As more stringent environmental noise pollution legislation comes into effect it becomes more important to reduce noise by previously uneconomic airframe configurations.

One source of noise pollution from the aircraft is noise generated by the engine, which is then reflected from an aerofoil surface of the aircraft such as a fuselage, tailplane or wing. The engine noise may be either from the engine itself or from the exhaust jet.

In the paper, "Model Tests Demonstrating Under-wing Installation effects on Engine Exhaust Noise", AIAA-80-1048, Way, D. J. & Turner, B. A., 1980, it is recited that reflection of the jet noise from the wing under-surface is evident, but is less than predicted. The reduced reflected noise is believed to arise principally from attenuation by the exhaust jet as the reflected noise passes through the jet exhaust.

Furthermore, in "Wing Effect on Jet Noise Propagations" AIAA-80-1047, 1980, Wang, M. E. acknowledges that the engine noise is reflected by the underside of the wing and part of which is then refracted and attenuated by the jet exhaust. Wang proposes a number of measures to reduce noise enhancement due to wing effects, firstly the jet engine should be positioned so that the major source distribution of the jet noise would be downstream of the trailing edge of the wing and secondly surface treatment of the underside of the wing. However, positioning the engine toward the trailing edge of the wing to avoid reflected noise would cause the engine to receive undesirable airflow from the underside of the wing and suffer an interference drag penalty. Furthermore, an engine mounted rearward of the wing trailing edge would need to be sufficiently far back that in the event of a rotor burst, fragment trajectories would not pass through the wing. Surface treatment of an aerofoil surface would cause a negative impact on the aerodynamic performance of the aircraft.

SUMMARY OF THE INVENTION

Therefore it is an object of the present invention to provide an aircraft comprising an aeroengine and a noise reflective surface, the aeroengine capable of generating a hot exhaust jet and noise characterized in that the reflective surface is profiled to reflect noise from the aeroengine into the hot exhaust jet thereby attenuating reflected noise.

Preferably, the reflective surface comprises a substantially arcuate profile with respect to a plane normal to the aeroengine centre line.

Preferably, the arcuate profile is generated by a radius from the engine centre-line. Alternatively, the arcuate profile is generated by a radius from below the engine centre-line.

Alternatively, the reflective surface comprises a substantially arcuate profile that extends between the leading edge of the wing to the trailing edge of the wing.

Alternatively, the noise is generated by the engine. Alternatively, the noise is generated by the mixing of the exhaust jets issuing from the engine and the ambient air.

Preferably, the reflective surface is that of a wing, alternatively the reflective surface is that of a fuselage.

BRIEF DESCRIPTION OF THE DRAWINGS

The present invention will be more fully described by way of example with reference to the accompanying drawings in which:

FIG. 2 is a rear view of a wing mounted gas turbine aeroengine.

DETAILED DESCRIPTION OF THE INVENTION

Figure 1:
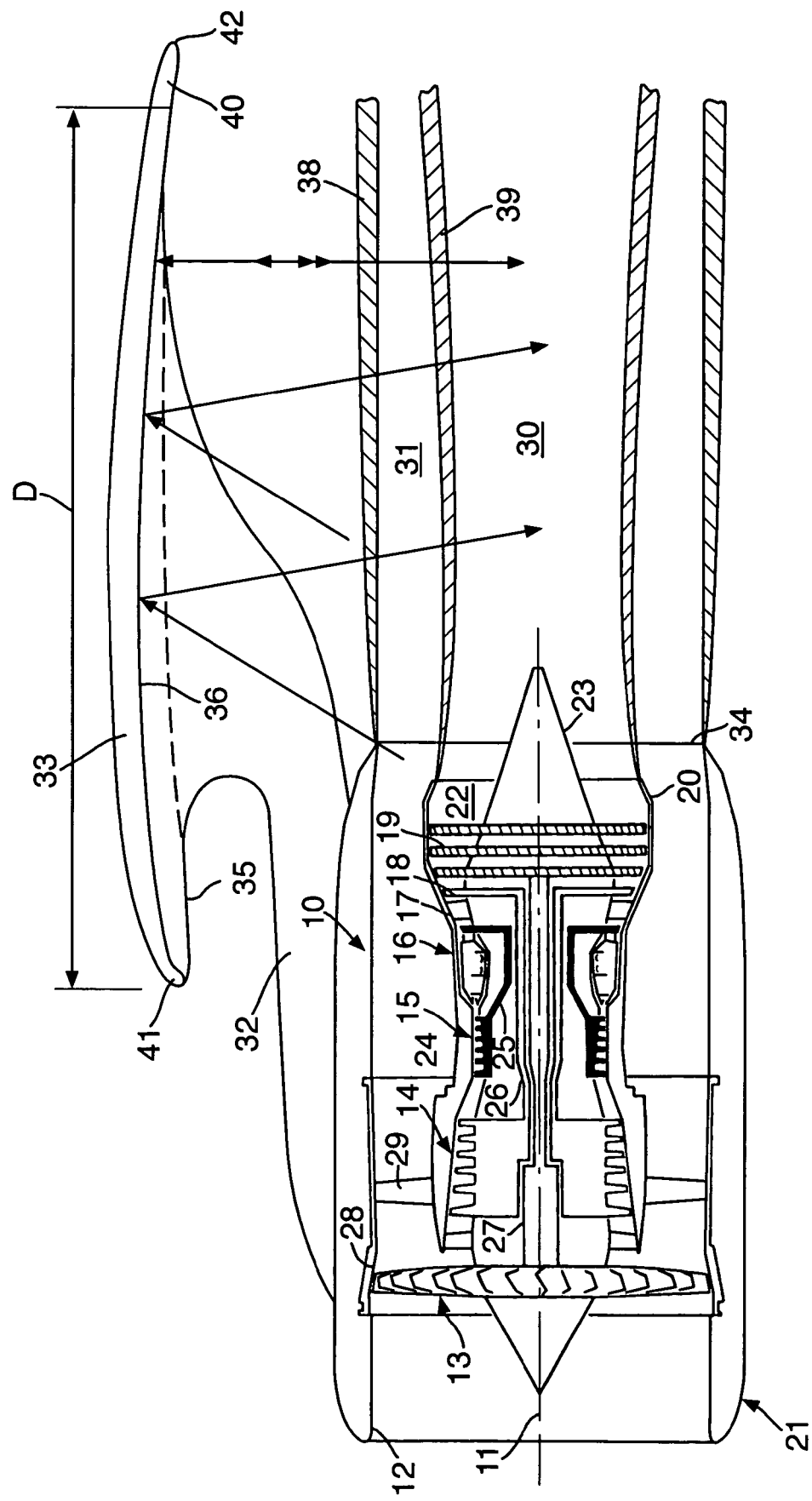
FIG. 1 is a schematic section of part of a ducted fan gas turbine engine and an aircraft wing in accordance with the present invention.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core nozzle 20. A core duct 22 is partly defined radially inwardly by a core plug 23 and radially outwardly by the core nozzle 20. A nacelle 21 or other aircraft architecture generally surrounds the engine 10 and defines the intake 12.

The gas turbine engine 10 works in the conventional manner so that air entering the intake 11 is accelerated by the fan 13 to produce two air flows: a first air flow into the intermediate pressure compressor 14 and a second air flow which passes through a bypass duct 24 to a bypass exhaust nozzle 34 to provide propulsive thrust in the form of a generally annular bypass exhaust jet 31. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust in the form of a generally circular core engine exhaust jet 30. The high, intermediate and low-pressure turbines 17, 18, 19 respectively drive the high and intermediate pressure compressors 15, 14 and the fan 13 by suitable interconnecting shafts 25, 26, 27.

The fan 13 is surrounded by a structural member in the form of a fan casing 28, which is supported by an annular array of outlet guide vanes 29. A pylon 32 extends from an aircraft wing 33 and attaches the engine 10 to the wing 33 in conventional fashion.

Where an aero-engine 10 is installed under an aircraft wing 33, or below a tail-plane assembly, the aerofoil underside surface 35 provides a substantial reflective surface 35, which increases the noise level below the aircraft. However, the engine's core exhaust jet 30 partially disperses and attenuates the reflected signal, reducing the reflected noise increase apparent below the aircraft. The dispersion of reflected noise is caused by refraction of the sound passing through the core jet 30, which has a higher speed than the bypass and ambient streams and is substantially circular in cross section. The attenuation is attributed to unsteadiness in the heated flow impeding the acoustic propagation of sound for noise having a wavelength that is small relative to the diameter of the jet 30.

The present invention comprises profiling the underside of the wing 33, or other reflective aircraft aerofoil surface 35, to reflect a greater proportion of the reflected noise into the core jet 30. FIG. 2 best shows a suitable profile 36 for focussing reflected noise into the core exhaust jet 30. The profile 36 is a defined by the arc of a radius R from the engine centre line 11. Thus any noise generated by the engine or exhaust jet will radiate from the centre-line and be reflected back substantially along the same radial path when looking at FIG. 2.

Profile 36 is an ideal profile considering only focussing reflective noise into the centre of the core exhaust jet 30. However, when considering also the aerodynamic performance of the wing 33 a shallower profile 37 is preferable. The shallower profile 37 is still capable of reflecting noise into part of the core exhaust nozzle jet 30 and thus remains beneficial to reducing reflected noise from the underside of the wing 33.

A benefit of the under wing profile 36, 37 is that there is an increase gully depth, that is the distance between the engine and the wing. This increased gully depth is advantageous in that there is either less aerodynamic interference drag for a given engine size or a larger engine with an increase fan diameter may be used with no aerodynamic interference drag reduction.

The profiling should be such that the incident sound rays emanating from the engine 10 and jet mixing 38, 39 noise sources are reflected back towards the hot jet. The resulting concave profiling 36, 37 has an axial extent D along the wing chord such that the engine 10 and jet mixing 38, 39 sources are reflected back to the hot jet for as much of the wing chord as practicable. In FIG. 2, the extent D of the profiled surface 36, 37 is substantially from the leading edge 41 of the wing 33 to the trailing edge 42. The profile extends from the trailing edge 41 as some noise is radiated towards this region and is then reflected towards and into the core exhaust stream 30 as the aircraft and engine travel forward out of the way of the reflected noise.

It is not necessary for the profile 36, 37 shown in FIG. 2 to be part circular, merely that the profile is capable of reflecting noise into the core or hot exhaust jet 30. Thus other arcuate profiles, such as an ellipse or a combination of dihedral and anhedral, are substitutable without departing from the scope of the present invention.

As shown in FIG. 1 the profiled under wing extends rearward to a wing flap 40 of the wing 33. However, the profile 36, 37 extends substantially between the leading edge 41 and the trailing edge 42 of the wing. The profile 36, 37 is generally arcuate, in respect of the section shown in FIG. 1, and is capable of directing the reflected noise into the core exhaust jet 30.

Considering the air flow in this region, the effects of aircraft motion, the engine and jet noise source distribution as well as other mechanisms affecting the acoustic propagation, the aircraft geometry—for instance, wing dihedral, and the observer position relative to the individual engines on the aircraft, the optimized design may vary from this simplified case. For instance, the radius of the concave surface R may vary both along the axial extent, D, and across the width-wise extent, L. L may also vary along the axial extent D as the radial extent of the core exhaust jet 30 increases. The axial extent For engines mounted under an aircraft tailplane, the underside of the tailplane surface should be profiled over an appropriate extent L to enable reflected noise reduction on the ground over a significant region. The radius R can vary azimuthally and axially along the length of the wing to optimize the hot jet dispersion and attenuation of the acoustic reflection in balance with the aerodynamic and structural considerations. It may be possible to extract aerodynamic advantage from this invention as a result of enabling the engine to tailplane underside spacing to be increased and to vary less with azimuthal angle, than with conventional designs.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An aircraft comprising a wing having an aeroengine mounted thereunder; said aeroengine having a bypass nozzle and a core nozzle, the wing having a surface comprising a discrete concave reflective surface portion, said bypass nozzle producing a bypass exhaust jet and said core nozzle producing a core exhaust jet characterized in that the concave reflective surface is positioned immediately downstream of said bypass nozzle and is profiled to the extent that reflected noise from the aeroengine and exhaust jets is focussed into the core exhaust jet thereby attenuating reflected noise from the profiled reflective surface, wherein said reflective surface comprises a substantially arcuate profile with respect to a plane normal to the aeroengine centre line, wherein said arcuate profile is generated by an arc of a radius from the engine centre line.

2. An aircraft as claimed in claim 1 wherein the arcuate profile is generated by a radius shorter than the ideal radius.

3. An aircraft as claimed in claim 1 wherein the reflective surface comprises a substantially arcuate profile that extends between the leading edge of the wing to the trailing edge of the wing.

4. An aircraft as claimed in claim 1 wherein the noise is generated by the engine.

5. An aircraft as claimed in claim 1 wherein the noise is generated by the mixing of the exhaust jets issuing from the engine and the ambient air.

6. An aircraft as claimed In claim 1 wherein the reflective surface is defined by a wing.

* * * * *